United States Patent [19]

Yamaue et al.

[11] Patent Number: 4,483,714

[45] Date of Patent: Nov. 20, 1984

[54] NITROCELLULOSE COMPOSITION AND PROCESS FOR PRODUCTION THEREOF

[75] Inventors: Matsuei Yamaue; Sadao Fukutomi; Seiichi Fukura; Fumihiko Sato, all of Miyazaki, Japan

[73] Assignee: Asahi Kasei Kogyo Kabushiki Kaisha, Osaka, Japan

[21] Appl. No.: 206,312

[22] Filed: Nov. 12, 1980

[30] Foreign Application Priority Data

Dec. 28, 1979 [JP] Japan .................................. 54-170312
Jun. 16, 1980 [JP] Japan .................................. 55-80137
Jun. 18, 1980 [JP] Japan .................................. 55-81399

[51] Int. Cl.$^3$ ............................ C08J 3/08; C08K 5/01; C08K 5/04; C08L 1/18
[52] U.S. Cl. .................................... 106/279; 106/170; 106/179; 106/183; 106/184; 106/185; 106/187; 106/189; 106/191; 106/198; 203/14

[58] Field of Search ............... 106/179, 195, 170, 185, 106/198, 191, 183, 187, 184; 203/14

[56] References Cited

U.S. PATENT DOCUMENTS

| | | | |
|---|---|---|---|
| 2,114,491 | 4/1933 | Hollabaugh | 203/14 |
| 2,935,414 | 5/1960 | Cook et al. | 106/195 |
| 3,188,224 | 6/1965 | Matalon | 106/195 |
| 3,236,702 | 2/1966 | Sapiego | 106/195 |
| 3,284,253 | 11/1966 | Enders et al. | 149/2 |
| 3,341,515 | 9/1967 | Connelly | 149/2 |

*Primary Examiner*—Allan M. Lieberman
*Attorney, Agent, or Firm*—Sughrue, Mion, Zinn, Macpeak, and Seas

[57] ABSTRACT

A nitrocellulose composition containing substantially no water consisting of a homogeneous phase comprising nitrocellulose and an organic liquid which is inert to isocyanate. The composition is suitable for compounding in polyurethane paint.

10 Claims, No Drawings

NITROCELLULOSE COMPOSITION AND PROCESS FOR PRODUCTION THEREOF

BACKGROUND OF THE INVENTION

This invention relates to a nitrocellulose composition suitable for compounding in polyurethane paint and a process for production thereof.

As is known in the art, nitrocellulose is often introduced or compounded in polyurethane paint, utilizing the reactivity of isocyanate to accelerate the hardening of a coated film and to improve the dispersibility of pigments and the smoothness of the coated film.

Since nitrocellulose has the possibility of spontaneously catching fire when allowed to stand in a dry state, a wetting agent is usually added to nitrocelluloses on the market, for the purpose of reducing the danger of fire during the storage, transportation, and handling thereof. As such wetting agents, alcohols such as methanol, ethanol, isopropanol, butanol, etc. are generally used. The wetting of nitrocellulose is carried out by washing water wetted-nitrocellulose with the wetting agent, but it is difficult to completely replace the water by the wetting agent, and water inevitably remains in the nitrocellulose. Nitrocelluloses on the market, therefore, ordinarily contain about 30% by weight alcohol and from 2 to 3% by weight water. (Hereinafter, all parts, ratios and percents are by weight unless otherwise indicated.)

In adding these nitrocelluloses to polyurethane paints, a problem arises in that the alcohol and water in the nitrocellulose undergo reaction with isocyanate groups, a hardening component of the polyurethane paint. The reaction of the isocyanate with the alcohol and water leads to a reduction in the crosslinking reactions necessary for hardening of a coated film and to the formation of low molecular weight compounds which act as plasticizers. This results in the reduction in the strength of a coated film. It is, therefore, preferred that nitrocelluloses to be added to polyurethane paints do not contain compounds which are reactive with isocyanate, particularly alcohols and water, which yield low molecular weight compounds through the reaction with isocyanate.

In addition to these alcohols, resins and plasticizers are often used as wetting agents for use in nitrocelluloses. For example, "Clear Chip" (trade name for a product of Asahi Kasei Kogyo Kabushiki Kaisha) contains dibutyl phthalate as a wetting agent, and in Japanese Patent Application (OPI) No. 142756/1977 (the term "OPI" as used herein refers to a "published unexamined Japanese patent application"), a vinyl chloride based resin is used as a wetting agent. In these cases, the above described problems have been solved by using those wetting agents which do not react with isocyanate. U.S. Pat. No. 3,763,061 discloses a method of positively solving the problems by employing as wetting agents isocyanate prepolymers containing isocyanate groups.

Nitrocelluloses, however, containing the above described wetting agents which remain in a coated film or participate in the formation of a coated film necessarily exert great influences on the physical properties of the coated film. Particularly, these nitrocelluloses impose limitations on the usefulness of the coated film with respect to the physical properties thereof, and their use in polyurethane paints having a wide variety of applications is limited. Therefore, nitrocelluloses which are to be used in polyurethane paints should desirably contain no components remaining in a coated film other than the nitrocellulose itself.

From this point of view, it is necessary that nitrocelluloses for use in polyurethane paints comprise nitrocellulose and a volatile component which does not react with isocyanate and does not remain in a coated film. For example, in accordance with U.S. Pat. Nos. 3,284,253 and 3,341,515, the wetting of nitrocellulose is carried out using hydrocarbons which do not dissolve nitrocellulose such as toluene. With the nitrocellulose so obtained, water is removed in the course of production, and thus it is considered to meet with the above described requirements.

The nitrocellulose thus-obtained, however, has not been in widespread use commercially because it has a drawback with respect to stability, i.e., the hydrocarbons used as wetting agents, which do not dissolve the nitrocellulose, are generally low in electric conductivity. Therefore, nitrocelluloses containing such hydrocarbons tend to become strongly electrostatically charged; furthermore, nitrocellulose particles are poor in flexibility, hard, and brittle, and are easily pulverized. These factors increase the possibility of the nitrocellulose catching fire by electrical discharge therefrom or the scattering thereof.

SUMMARY OF THE INVENTION

The general object of this invention is to provide a nitrocellulose composition containing, other than nitrocellulose, no components which react with isocyanate and remain in a coated film, and having sufficient stability to such an extent that it can commercially be used, and a process for producing said nitrocellulose composition.

This invention, therefore, comprises a nitrocellulose composition containing substantially no water which consists of a homogeneous phase comprising nitrocellulose as a sole solid forming component and an organic liquid which is inert to isocyanate, and a process for producing the nitrocellulose composition.

DETAILED DESCRIPTION OF THE INVENTION

Preferred nitrocellulose compositions according to this invention can have the following characteristics:

(1) A nitrocellulose composition containing substantially no water, which consists of a homogeneous phase comprising nitrocellulose as a sole solid forming component and an organic liquid which is inert to isocyanate.

(2) A nitrocellulose composition as in (1) wherein the homogeneous phase is a fluid liquid containing not more than 50% nitrocellulose.

(3) A nitrocellulose composition as in (1) wherein the homogeneous phase is a solid phase containing from 60% to 80% nitrocellulose.

(4) A nitrocellulose composition as in (1) wherein the organic liquid is consisting of an organic solvent capable of disolving nitrocellulose (hereinafter, referred merely to as "a solvent") and an organic non-solvent incapable of disolving nitrocellulose (hereinafter, referred merely to as "a non-solvent").

(5) A nitrocellulose composition as in (4) wherein the ratio of solvent to non-solvent is from 9/1 to 1/9.

(6) A nitrocellulose composition as in (4) in the form of pellets or flakes.

A primary requirement with which the nitrocellulose composition of this invention should meet is that the nitrocellulose and organic liquid constituting the composition form a homogeneous phase. In order to more fully explain the conditions under which the homogeneous phase is produced with respect to a three component composition changes in the properties of a three component composition when the composition ratio is varied will be explained for a composition consisting of nitrocellulose, methyl isobutyl ketone as a solvent and xylene as a non-solvent.

First, the nitrocellulose content is fixed at 70% and the remainder comprises solvent and non-solvent, i.e., the ratio of the solvent to the non-solvent can be varied. When the remainder is only the solvent, i.e., no non-solvent is added, a homogeneous composition in the form of gel having a high viscosity is obtained. As the proportion of the non-solvent increases, the resulting composition gradually loses stickiness and fluidity. When the ratio of the solvent to the non-solvent is 2/8, the composition obtained is in the form of solid and has flexibility, although its fluidity and stickiness are low. In further increasing the proportion of the non-solvent, the resulting composition cannot now absorb the non-solvent in the vicinity of the ratio of the solvent to the non-solvent of 1/9, and begins to separate into a solid nitrocellulose phase and a liquid non-solvent phase, and the homogeneous phase is lost.

The same tendency as above is observed in the case wherein the nitrocellulose content is fixed at 30%. When the remainder of the composition is only the solvent, i.e., no non-solvent is added, the composition obtained is a fluid liquid. However, when the proportion of the non-solvent is increased up to the ratio of the solvent to the non-solvent of 2/8, the resulting composition becomes a sticky gel material of low fluidity. In further increasing the proportion of the non-solvent, the composition begins to separate into a sticking nitrocellulose phase in the form of gel and a liquid non-solvent phase in the vicinity of the ratio of 15/85, and the homogeneous phase is lost.

The testing of combinations of solvents and non-solvents which are mutually soluble, as selected from a wide variety of solvents and non-solvents as hereinafter described, in the same manner as above, has revealed that when the solvent exists in an amount exceeding the ratio of the solvent to the non-solvent of 1/9 in the composition, a homogeneous phase consisting of the nitrocellulose and organic liquid is generally obtained.

The main advantage resulting from the fact that the nitrocellulose composition of this invention consists of a homogeneous phase is that the possibility of catching fire is reduced. In particular, this effect is significant in the case when the composition is a solid. In heretofore known alcohol-wetted nitrocelluloses and those nitrocelluloses wetted only by non-solvents incapable of dissolving nitrocellulose (U.S. Pat. Nos. 3,284,253 and 3,341,515), the wetting agent merely covers the surface of nitrocellulose. Therefore, when these nitrocelluloses are scattered during the handling thereof, the wetting agent merely covering the surface of nitrocellulose is easily stripped or lost and the nitrocellulose thus exposed can easily come in contact with air and catch fire. In the nitrocellulose composition of this invention, on the other hand, the solvent is incorporated and fixed in the nitrocellulose matrix. Therefore, even if the composition is scattered, the vapor of the solvent is supplied from the interior of the composition to the surface thereof and prevents the composition from coming in contact with air such that the nitrocellulose can catch fire. Furthermore, the solvent in the nitrocellulose composition of this invention has a high affinity to the nitrocellulose, and at the time of scattering, therefore, the evaporation of the solvent is slow as compared with that of the non-solvent. Thus the effect of preventing the nitrocellulose from contacting with air is maintained.

Another advantage of the nitrocellulose composition of this invention with respect to the stability thereof, especially when the composition is a solid, is that the composition is only sparingly ground during the transportation and handling thereof because of its softness, and the possibility of catching fire owing to the scattering of powdery composition is reduced.

Another advantage is that, as compared with non-solvent wetted nitrocelluloses, the composition of this invention possesses increased electrical conductivity, and is electrostatically charged only with difficulty. Therefore the danger of catching fire due to the discharge of electrostatic charge is reduced to such an extent that the composition can be put into commercial use without hindrance. This can be easily understood from the fact that the electrical conductivities of non-solvents are usually from about $10^{-12}$ to $10^{-14}$ /cm (25° C.) whereas those of solvents are usually from about $10^{-7}$ to $10^{-10}$ /cm (25° C.).

Practically preferred ranges with respect to the nitrocellulose composition of this invention will hereinafter be described.

First, forms in which the homogeneous composition of this invention can exist are explained by reference to the nitrocellulose-methyl isobutyl ketone-xylene three component composition as used in the aforegoing explanation. When nitrocellulose is added to a mixture of solvent=30 and non-solvent=70, which is a typical example, a composition containing 10% nitrocellulose is in the form of solution of high fluidity. However, when the nitrocellulose content reaches 40%, the solution changes to a gel of high stickiness and low fluidity. On increasing the nitrocellulose content up to about 60%, the resulting composition becomes semi-solid and loses stickiness. At a nitrocellulose content of 70%, the resulting composition becomes a non-sticky solid which does not easily deform.

Although there are no definite lines of demarcation between liquid, sticking gel, and non-sticky solid as described above, these terms are used in this invention in the following meanings:

"Fluid liquid" refers to a composition having a viscosity of 50,000 cps or less; "non-sticky solid" refers to a composition having high hardness and low stickiness to the extent that when it is converted into the form of pellets or flakes, placed in a container and stored or transported, the pellets or flakes are subject to no marked deformation or sticking which interferes with the commercial use thereof; and "sticking gel" refers to a composition intermediate between the fluid liquid and the non-sticky solid.

The testing of combinations of solvents and non-solvents which are mutually soluble, as selected from a wide variety of solvents and non-solvents as hereinafter described, in the same manner as above, has revealed that in producing a homogeneous composition by mixing nitrocellulose and an organic liquid, as will be described in detail hereinafter, when the nitrocellulose content is not more than 50%, i.e., 50% or less, the composition is a fluid liquid; when it is 60% or more, the composition is a non-sticking solid; and when it is between 50% and 60%, the composition is a sticking gel.

The compositions in any of the above described forms can be used in this invention so long as they are a homogeneous phase. Most preferred from the standpoint of commercial practice is the non-sticking solid, and the next preferred after the non-sticking solid is the fluid liquid. The high stickness and low fluidity of the sticking gel material makes production and handling thereof difficult. Since the fluid liquid contains a larger amount of an organic liquid than the non-sticking solid, it is not economical with respect to transportation costs, and, in the production of paint using the fluid liquid, the choice of solvents is limited. Furthermore, when the fluid liquid is placed in a container, some liquid remains therein attaching thereto, but the non-sticking solid is free from such problem.

In the composition of this invention in the form of the non-sticking solid, the preferred nitrocellulose content is from 60 to 80%. Even though the composition of this invention is increased in the stability against firecatching, if the nitrocellulose content is 80% or more, the danger of decomposition or catching fire due to the impact during the handling thereof is increased. On the other hand, when the nitrocellulose content is less than 60%, the resulting composition is not in the form of the non-sticking solid which can be handled with ease.

In the composition in the form of the non-sticky solid according to this invention, the ratio of the solvent to the non-solvent should be controlled at from 9/1 to 1/9. When the ratio is less than 1/9, the resulting composition separates into two phases, or even if it forms a homogeneous phase, it is hard, brittle, and of poor softness. On the other hand, when the ratio exceeds 9/1, the stickiness of the composition increases, undesirably resulting in the conversion thereof into the form of the less preferred sticking gel as described above.

The composition of this invention in the form of the fluid liquid can be obtained at a nitrocellulose content of 50% or less, and so long as the composition is of a homogeneous phase, there is no special limitation thereon. From a standpoint of economic efficiency, the nitrocellulose content of the composition should desirably be controlled to about 20% or more.

A secondary requirement which the nitrocellulose composition of this invention should meet with is that the organic liquid contained in the composition does not react with isocyanate and does not remain as a solid in a coated film.

Organic liquids which meets with the above requirement are organic solvents capable of dissolving nitrocellulose or mixtures of an organic solvent capable of dissolving nitrocellulose and an organic non-solvent incapable of dissolving nitrocellulose. Examples of organic solvents include ethyl acetate, propyl acetate, butyl acetate, ethylene glycol monomethyl ether acetate, ethylene glycol monoethyl ether acetate, methyl ethyl ketone, methyl isobutyl ketone, isophorone, cyclohexanone, nitroethane and nitropropane. Examples of organic non-solvent include hexane, heptane, octane, solvent naphtha, cyclohexane, methylcyclohexane, benzene, toluene and xylene.

Of these organic liquids, methyl ethyl ketone and methyl isobutyl ketone are advantageously used as solvents and toluene and xylene are advantageously used as non-solvents. This is because they are in commercial use, they form azeotropic mixtures with water, thus advantageously removing the water from the composition, and they are mutually soluble.

A third requirement which the nitrocellulose composition of this invention should meet with is that it contains substantially no water. Water in the present composition may be introduced from the production feeds, but can be removed, as will be described later, in the course of production. Although the water content of the nitrocellulose composition of this invention is desirably as small as possible, provided that it is 1% or less, the advantages of this invention will not be adversaly affected. Thus "substantially no water" as used herein means not more than 1% water.

Any nitrocellulose known for use in paints can be used as the nitrocellulose of this invention. The degree of polymerization, nitrogen content, and viscosity of the nitrocellulose are not critical, but nitrocelluloses described in JIS-K-6703 are preferably used in the present invention.

Stabilizers as used in known nitrocellulose products can be added to the nitrocellulose composition of this invention, to such an extent as not to deteriorate the advantages of this invention.

Hereinafter a method of preparing the nitrocellulose composition of this invention will be explained in detail:

A nitrocellulose feed which has been wetted by alcohol, water, or both is dissolved in a solent capable of dissolving nitrocellulose or a mixture of a solvent capable of dissolving nitrocellulose and a non-solvent incapable of dissolving nitrocellulose, to form a nitrocellulose composition, and then the nitrocellulose composition is subjected to distillation to distill away the alcohol, water, or both. Alternatively, before or in the course of the distillation of the nitrocellulose composition, a non-solvent incapable of dissolving nitrocellulose or a mixture of a solvent capable of dissolving nitrocellulose and a non-solvent incapable of dissolving nitrocellulose is added to the nitrocellulose compostion and then the resulting nitrocellulose composition is subjected to distillation to distill away the alcohol, water, or both. A homogeneous composition according to the invention is thus obtained.

Any nitrocellulose feed containing no other components which remain in a coated film can be used in this invention. From a standpoint of ease of availability, it is convenient to employ as a feed alcohol-wetted nitrocellulose which is available on the market or water-wetted nitrocellulose which is obtained in the course of production of nitrocellulose.

This nitrocellulose feed is first dissolved in a solvent or in a mixture of a solvent and a non-solvent. By the word "dissolve" as herein used is meant that the nitrocellulose softens, absorbing the solvent, and the amount of the nitrocellulose remaining in the form of fiber is 20% or less. The word "dissolve" does not necessarily mean that a solution having fluidity results. Even though the state of dissolution is to such an extent, no hindrance occurs in obtaining a product of a homogeneous phase, because the dissolution further proceeds at later stages. This state of dissolution is attained, usually, when the solvent is present in an amount of 30% or more based on the nitrocellulose, although it varies depending upon the amount of the coexisting non-solvent.

When it is intended to obtain a nitrocellulose composition in the form of a fluid liquid, of course, a relatively large amount of solvent is used, and the fluidity is maintained. It is not necessary to add a nonsolvent in dissolving the nitrocellulose feed.

In producing a nitrocellulose composition in the form of a non-sticking solid, it is desired that dissolving of the composition is achieved by using a solvent of the smallest possible amount, and that the solvent is used in combination with a non-solvent. This is because the dissolved composition obtained becomes a semi-solid having no stickiness and prior to the subsequent distillation, it can be molded in a desired form. This molding is carried out, for example, by extruding the dissolved composition from an extruder in the form of strand and then cutting with a cutter whereby pieces in the form of pellets are obtained. Since this shape is maintained even after the distillation, the shape of the composition product can be determined at this stage. From a standpoint of lowering the evaporation amount of the solvent by reducing the surface area of the composition product relatively as the shape thereof, the form of pellets or flakes is preferred rather than the form of a powder or granule. It is advantageous to convert the composition in the form of pellets or flakes. It is one of the advantages of this invention that a solid product in the desired form can be produced.

The nitrocellulose composition in the state that is dissolved is then subjected to a distillation procedure to distill the alcohols, water or both contained therein, together with a part of the organic liquid.

In applying the distillation process to the molded semi-solid composition, a mixture of a solvent and a non-solvent or a non-solvent may be supplemented thereto prior to the distillation to allow the mixture or non-solvent to exist in an amount sufficient to distill away the alcohols, water or both. A non-solvent is preferably employed, since non-solvents do not deteriorate the shape of the composition product. However, since the amount of the solvent in the molded product is thus lowered during the distillation procedure, it is necessary to supplement the solvent also. It is, therefore, preferred to supplement the solvent as a mixture in combination with a non-solvent in the course of distillation in order to prevent the molded product from becoming sticky. At the stage that the mixture or non-solvent is added to the molded product, solid-liquid two phases are formed, but as the distillation proceeds, the liquid phase disappears and the desired homogeneous nitrocellulose composition is obtained.

For the distillation of such semi-solid molded product, conventional drying equipment provided with an evaporator can be used. The distillation is preferably carried out at a temperature of 150° C. or less to prevent the thermal decomposition of the nitrocellulose, and the pressure at which the distillation is carried out is so adjusted that the boiling point of the solvent or non-solvent used is less than 150° C.

In the distillation process to obtain a nitrocellulose composition in the form of a fluid liquid, a fluid composition in the state that is dissolved is fed. In this case, it is not necessary to supplement an organic liquid prior to or in the course of the distillation since the amount of the organic liquid being used is not limited. As an equipment for use in the distillation, those which permit to expose the heat transfer surface, such as an evaporator equipped with a scratching device, are advantageously employed. The operation conditions are the same as those for the production of the above described solid product.

By distilling a fluid composition in the dissolved state, it is possible to obtain a composition in the form of a non-sticking solid. In this case, however, the composition becomes a sticking gel material in the course of distillation and sticks to the inner surface of the equipment, causing various troubles. It is, therefore, necessary to lower the stickiness by adding a non-solvent or a mixture of a solvent and a non-solvent in the course of distillation. Moreover, since the formed solid composition is necessary to be shaped in the evaporation equipment, it is desirable to employ a dryer equipped with a crushing means in the interior thereof. The operation conditions are the same as for the above described other procedures. As a method of obtaining a composition in the form of solid, a method including a molding stage is superior in that a desired shape can be obtained and problems in the couse of distillation are reduced.

U.S. Pat. No. 3,284,253 discloses a method of producing non-solvent wetted nitrocellulose. According to this method, nitrocellulose is first softened by adding an organic solvent to an aqueous slurry of the nitrocellulose to such an extent that fibrous nitrocellulose disappears and then formed into particles. Thereafter, the organic solvent is removed by distillation and the remaining excessive water is separated to obtain wetted nitrocellulose. After adding of a volatile non-solvent to the wetted nitrocellulose, the water is removed by distillation to provide non-solvent wetted nitrocellulose which is hard and in the form of granule, and which contains from 10 to 40% non-solvent which is not absorbed in the particle and is freely drained from the granule. Although this method is similar in some respects to this invention, the nitrocellulose composition produced by this method differs from the process of this invention in that the nitrocellulose composition resulting from the former method consists of a solid phase and a liquid phase. Although this method includes a step of dissolving the nitrocellulose in the organic solvent, the step is merely for the purpose of molding the nitrocellulose and the solvent is removed at the distillation step. Therefore, the method of U.S. Pat. No. 3,284,253 is quite different from this invention.

U.S. Pat. No. 3,188,244 described an organosol of nitrocellulose. Water-wetted nitrocellulose is dissolved in a mixture of a solvent and a non-solvent to form a homogeneous solution. This homogeneous solution is subjected to phase separation by distilling away a part of the water and solvent to form a colloid dispersion of the nitrocellulose solution in the non-solvent. Furthermore, a polar solvent containing a hydroxy group and a keto group is added and orientated on the surface of colloids to provide a stabilized colloid dispersion. This organosol consists of two phases although it contains an organic solvent, and therefore it is different from the nitrocellulose composition of this invention. Moreover, this composition is reactive with isocyanate because the addition of the polar solvent containing the hydroxy group is essential, and it therefore cannot exhibit the advantages of this invention. Therefore, U.S. Pat. No. 3,188,244 is also quite different from this invention.

The nitrocellulose composition of this invention can be used as a compounding agent without the problems which usually accompany use of nitrocelluloses available on the market. The composition of this invention exhibits excellent characteristics when it is compounded in polyurethane paint. In particular, when added to a binder for magnetic coating compositions, it exhibits effects that could not be attained by conventional nitrocellulose compositions. Particularly, since the composition of this invention contains no components which react with isocyanate, other than nitrocellulose, the strength of the coated film can be increased. This increase permits an increase in the amount of magnetic powder being compounded, and this results in an increase of magnetic recording density. This brings about an advantageous effect in video types, for which high density magnetic recording is required. Furthermore, when the composition of this invention is used in a binder for video tapes, the adhesion to the base film can be increased and the smoothness of the coated film can be increased.

The following examples are given to illustrate this invention in greater detail. All parts, ratios and percents are by weight unless otherwise indicated.

EXAMPLE 1

200 g of H$\frac{1}{8}$ nitrocellulose which had been wetted with isopropyl alcohol to a degree of 30% was dissolved in 360 g of butyl acetate with stirring to prepare a nitrocellulose solution. This nitrocellulose solution was placed in a rotary evaporator (produced by Yamato Kagaku K. K.) and vacuum-distilled by use of an aspirator while heating at 60° C. in a water bath to obtain 350 g of a nitrocellulose solution in the form of dope and with a solid content of 40%. The nitrocellulose in the concentrated dope-like nitrocellulose solution had a viscosity characteristic of H$\frac{1}{8}$. The water content of the nitrocellulose solution was measured by the Karl Fischer's method and found to be 0.14%. This value was of the same level as 0.13% of industrial butyl acetate used in dissolving the nitrocellulose. Gaschromatographic analysis confirmed that the nitrocellulose solution contained only a trace of isopropyl alcohol.

EXAMPLE 2

133 g of H$\frac{1}{4}$ nitrocellulose which had been wetted with water to a degree of 25% was dissolved in 400 g of butyl acetate with stirring to prepare a cloudy nitrocellulose. This nitrocellulose solution was placed in a rotary evaporator and vacuum-distilled by use of an aspirator while heating at 60° C. in a water bath to obtain 330 g of a nitrocellulose solution in the form of dope and with a solid content of 30%. The nitrocellulose in the concentrated dope-like nitrocellulose solution had a viscosity characteristic of H$\frac{1}{4}$, and the water content of the nitrocellulose solution was 0.20%.

EXAMPLES 3 AND 4

Mixed solvent A having the composition as shown below was added to 27.3 parts of acrylpolyol (produced by Dai-Nippon Ink and Chemicals Inc. under the trade name of Acrydick A 801) and 15.6 parts of a hardener, polyisocyanate (produced by Nippon Polyurethane Co., Ltd. under the trade name of Colonate L) to prepare the corresponding solutions having a solid content of 30%. The H$\frac{1}{8}$ dope-like nitrocellulose solution of Example 1 was added to the acrylpropyl solution. The resulting solution was further mixed with the above prepared hardener solution and used as a so-called two-part polyurethane paint.

| Composition of Mixed Solvent A | |
|---|---|
| Methyl Ethyl Ketone | 15 parts |
| Butyl Acetate | 37 parts |
| Toluene | 38 parts |

| Composition of Mixed Solvent A | |
|---|---|
| Cellosolve Acetate | 10 parts |

The dry tack and the pencil hardness of the resulting coating film were measured and the results are shown in Table 1.

TABLE 1

| | Example 3 | Example 4 | Comparative Example 1 |
|---|---|---|---|
| Amount of nitrocellulose solution added (parts) | 20 | 10 | none |
| Viscosity of paint (cps) at 25° C. | 90 | 34 | 12 |
| Dry tack[1] (seconds) | 490 | 525 | 880 |
| Pencil hardness[2] (after 3 hours) | HB | 2B | 5B |

Note:
[1]The dry tack was measured according to JIS-K-5400, in which the solution was coated on a glass plate in a thickness of 10 mil by use of an applicator.
[2]The pencil hardness was measured according to JIS-K-5400.

It can be seen from the above results that the addition of the nitrocellulose solution increases the initial drying properties and initial hardness of the coating film and is an effective nitrocellulose.

EXAMPLE 5

143 g of H$\frac{1}{4}$ nitrocellulose with a water content of 30% was dissolved in 400 g of methyl isobutyl ketone (hereinafter, referred to as "MIBK") to prepare a nitrocellulose solution. This nitrocellulose solution was placed in a rotary evaporator (produced by Yamato Kagaku K. K.) and vacuum-distilled by use of an aspirator while heating at 70° C. in a water bath to obtain 330 g of a nitrocellulose solution with a solid content of about 30%. To this nitrocellulose solution was further added 250 g of xylene, and the resulting solution was vacuum-distilled in the same manner as above to obtain 166 g of a nitrocellulose composition in the form of solid. This solid nitrocellulose composition had a solid content of 60% and the nitrocellulose in the composition had a viscosity characteristic of H$\frac{1}{4}$. The water content of the composition was measured by the Karl Fischer's method and found to be 0.35%. The solvent composition was measured by gas charomatography and the ratio of MIBK to xylene was found to be 3:7. Moreover, since the composition was a nonsticking solid, no attachment to the walls of a container occurred, and workability of handling was excellent.

EXAMPLE 6

In the same manner as in Example 5 except that 225 g of n-octane was used in place of the xylene, 170 g of a nitrocellulose composition was obtained. The solid content of the nitrocellulose composition was 58% and the viscosity characteristic of the nitrocellulose in the nitrocellulose composition was H$\frac{1}{4}$. The water content of the nitrocellulose composition was measured by the Karl Fischer's method and the ratio of MIBK to n-octane was measured by gas chromatography. The water content was 0.3% and the ratio of MIBK to n-octane was 27:73.

EXAMPLE 7

In the same manner as in Example 5 except that 400 g of toluene was used in place of xylene, 169 g of a nitrocellulose composition was obtained. The solid content of the nitrocellulose composition was 59% and the water content of the composition was 0.31%. Since the composition is a solid of low stickness, workability of handling was good.

EXAMPLE 8

143 g of H¼ nitrocellulose with a water content of 30% was dissolved in a mixture of 400 g of MIBK and 400 g of xylene with stirring to prepare a nitrocellulose solution. This solution was placed in a rotary evaporator and vacuum-distilled by use of an aspirator while heating at 90° C. on a water bath to obtain 166 g of a nitrocellulose composition with a solid content of 60%. This nitrocellulose composition had a viscosity characteristic of H¼. The water content of the composition was 0.28% and the ratio of MIBK to xylene was 28:72.

EXAMPLE 9

In the same manner as in Example 8 except that 400 g of butyl acetate was used in place of MIBK, 175 g of a nitrocellulose composition was obtained. With this nitrocellulose composition, the solid content, the water content and the ratio of butyl acetate to xylene were 57%, 0.36% and 4:6, respectively. Since the composition was a solid of no stickness, no attachment to the walls of a container occurred and the workability of handling was very good.

EXAMPLE 10

143 g of nitrocellulose with an isopropyl alcohol content of 30% was dissolved in a mixture of 400 g of methyl ethyl ketone and 200 g of toluene with stirring to prepare a nitrocellulose solution. This nitrocellulose solution was placed in a rotary evaporator and vacuum-distilled by use of an aspirator while heating at 70° C. to obtain 172 g of a nitrocellulose composition. With the nitrocellulose composition, the solid content and the water content were 58% and 0.35%, respectively. Gas chromatographic analysis proved that the composition contained only a trace of isopropyl alcohol.

EXAMPLE 11

143 g of nitrocellulose with an isopropyl alcohol content of 30% was added to a mixture of 400 g of MIBK and 400 g of xylene and processed in the same manner as in Example 8 to prepare 175 g of a nitrocellulose composition. With this nitrocellulose composition, the solid content, the water content and the ratio of MIBK to xylene were 57%, 0.3% and 4:6, respectively. Gas chromatographic analysis proved that the composition contained only a trace of isopropyl alcohol. Furthermore, since the composition was a solid of no stickness, no attachment to the walls of a container occurred, and the workability of handling was very good.

EXAMPLE 12

143 g of H¼ nitrocellulose with a water content of 30% was dissolved in 400 g of MIBK with stirring to prepare a nitrocellulose solution. This nitrocellulose solution was placed in a rotary evaporator and vacuum-distilled by use of an aspirator while heating at 85° C. in a water bath to obtain 330 g of a nitrocellulose solution. To this solution was further added 100 g of n-octane, and the resulting solution was vacuum-distilled to obtain 170 g of a nitrocellulose composition. The solid content of the nitrocellulose composition was 58% and the nitrocellulose in the composition had a viscosity characteristic of H¼. The water content and the ratio of MIBK to n-octane were 0.45% and 9:1, respectively. This composition was somewhat sticky and slight attachment to the walls of a container occured. However, 95% or more of the sticked composition could be recovered with a glass rod.

EXAMPLE 13

In the same manner as in Example 12 except that 500 g of xylene was used in place of the n-octane, 170 g of a nitrocellulose was obtained. With this nitrocellulose composition, the solid content, the water content and the ratio of MIBK to xylene were 58%, 0.46% and 12:88, respectively. Although this composition was a solid in the form of powder, the amount of the composition attached to the walls of a container was small, but the container tended to become powdery.

EXAMPLE 14

In the same manner as in Example 5, a nitrocellulose solution was prepared. To this nitrocellulose solution was added 250 g of xylene, and the resulting solution was vacuum-distilled. This vacuum-distillation was interrupted to obtain 248 g of a nitrocellulose composition with a solid content of 40%. Although this nitrocellulose composition was a slightly soft gel, the amount of the composition sticked to the walls of a container was small and almost all of the sticked composition could be recovered by slightly rubbing with a glass rod, and thus the workability of handling was good.

REFERENCE EXAMPLE 1

In the same manner as in Example 5 except that no xylene was added, i.e., a MIBK solution was vacuum-distilled, 248 g of a nitrocellulose composition with a solid content of 40% was obtained. This nitrocellulose composition was a viscous solution of high viscosity and of almost no fluidity, and the amount of the composition sticked to the walls of a container was great. Even by removing the sticked composition with a glass rod, only about 60% could be recovered, and the handling workability of the nitrocellulose composition was low.

REFERENCE EXAMPLE 2

The same solution as used in Reference Example 1 was further vacuum-distilled to obtain 180 g of a nitrocellulose composition with a solid content of 55%. Although this nitrocellulose composition was in the form of solid, the sticking force was strong and it firmly sticked to a container to the extent that the sticked one could not be removed with a glass rod. Thus, the handling workability of the composition was low.

REFERENCE EXAMPLE 3

In the same manner as in Example 13 except that the amount of the xylene was increased to 700 g, 170 g of a nitrocellulose composition was obtained. With this nitrocellulose composition, the solid content, the water content and the ratio of MIBK to xylene were 58%, 0.25% and 8:92, respectively. This composition was in the form of fine powder, and during the removal of the composition from the container, a cloud of powder was formed and the nitrocellulose was scattered. This was not preferred for handling of nitrocellulose.

EXAMPLE 15

100 g of methyl isobutyl ketone was added to 143 g of H½ nitrocellulose with a water content of 30% and the resulting mixture was lightly kneaded to obtain a composition in the form of paste. This composition was charged to a manually operated-screw extruder equipped with a dies having a number of fine holes of 2 m/m φ, extruded through the fine holes into 300 g of toluene and then cut to a length of about 20 m/m to obtain pellet-like molds. These pellet-like molds together with the toluene were placed in a rotary evaporator (produced by Yamato Kagaku K.K.) and vacuum-distillation was carried out at 200 Torr in a water bath heated to 80° C. to obtain 153 g of a molded nitrocellulose composition having a solid content of 65%. In this molded nitrocellulose composition, no fibrous nitrocellulose was observed. It was a solid of good fluidity and free from the attachment to a wrapping container, and thus its handling workability was very good. The nitrocellulose in the moded nitrocellulose composition had a viscosity characteristic of $H_{\frac{1}{2}}$. The water content of the molded nitrocellulose composition was measured by the Karl Fischer's method and the solvent composition, by gas chromatography. The water content was 0.7% and the ratio of MIBK to toluene was 4:6.

EXAMPLE 16

A mixture of 30 g of MIBK and 70 g of toluene was added to 134 g of $H_{\frac{1}{2}}$ nitrocellulose with a water content of 25%, and the resulting mixture was lightly kneaded manually to obtain a somewhat hard paste-like composition. The composition so obtained was extruded in a previously prepared mixture solvent of 480 g of toluene and 120 g of MIBK and cut in the same manner as in Example 15 to obtain a mold containing water. These molds together with the above mixed solvent were subjected to vacuum-distillation in the same manner as in Example 15 to obtain 163 g of a molded nitrocellulose composition having a solid content of 61%. With the molded nitrocellulose composition, the water content and the ratio of MIBK to toluene were 0.5% and 25:75, respectively. The molded nitrocellulose composition contained no fibrous nitrocellulose and was a solid product of high fluidity which maintained nearly the same shape as obtained at the time of molding. Workability of removal from a container was very good.

EXAMPLE 17

A mixture of 65 g of MIBK and 45 g of toluene was added to 134 g of $H_{\frac{1}{2}}$ nitrocellulose having a water content of 25%, and the resulting mixture was lightly kneaded manually to obtain a paste-like composition which was soft, but of almost no fluidity. The composition so obtained was extruded into 800 g of a previously prepared toluene and cut in the same manner as in Example 15 to obtain a water-containing mold. The total quantity of the mold and the toluene was vacuum-distilled at 150 Torr in the same manner as in Example 15 to obtain 142 g of a molded nitrocellulose composition with a solid content of 70%. The water content was 0.8% and the ratio of MIBK to toluene, 18:82. In the molded nitrocellulose composition, no fibrous nitrocellulose was observed, and it was a solid product of high fluidity which maintained nearly the same shape as obtained at the time of molding. Workability of removal from a container was very good.

EXAMPLE 18

100 g of MIBK was added to 143 g of $H_{\frac{1}{2}}$ nitrocellulose having a water content of 30%, and the resulting mixture was lightly kneaded manually to obtain a paste-like composition. The composition so obtained was extruded in 300 g of xylene and cut in the same manner as in Example 15 to obtain a water-containing molded product. The molded product together with the xylene was subjected to vacuum-distillation at 50 Torr in the same manner as in Example 15 to obtain 133 g of a molded nitrocellulose composition having a solid content of 75%. The water content was 0.6% and the ratio of MIBK to xylene was 19:81.

EXAMPLE 19

100 g of butyl acetate was added to 143 g of $H_{\frac{1}{2}}$ nitrocellulose having a water content of 30%, and the resulting mixture was lightly kneaded manually to obtain a paste-like composition. The composition so obtained was extruded into 350 g of xylene and cut in the same manner as in Example 15 to obtain a water-containing molded product. The molded composition together with the xylene were subjected to vacuum-distillation at 50 Torr in the same manner as in Example 15 to obtain 133 g of a molded nitrocellulose composition having a solid content of 75%. With the molded nitrocellulose composition, the water content and the ratio of butyl acetate to xylene were 0.5% and 21:79, respectively.

EXAMPLE 20

A mixture of 35 g of MIBK and 35 g of xylene was added to 143 g of $H_{\frac{1}{4}}$ nitrocellulose containing 30% of isopropyl alcohol, and the resulting mixture was lightly kneaded with hand to obtain a paste-like composition. The viscosity at 20° C. of the composition so obtained was attempted to measure by use of a Brookfield viscometer (hereinafter, referred to as "a B-type viscometer"), but it was more than 100,000 cps and could not be exactly measured. The composition was extruded into 600 g of xylene and cut in the same manner as in Example 15 to obtain a water-containing molded product. This molded product containing xylene was subjected to vacuum-distillation at 50 Torr in the same manner as in Example 15 to obtain 142 g of a molded nitrocellulose composition having a solid content of 70%. With the molded nitrocellulose composition, the water content and the ratio of MIBK to xylene were 0.6% and 2:8, respectively. Gas chromatographic analysis proved that the composition contained only a trace of isopropyl alcohol. The nitrocellulose in the molded nitrocellulose composition had a viscosity characteristic of $H_{\frac{1}{4}}$.

EXAMPLE 21

100 g of MIBK was added to 134 g of $L_{\frac{1}{2}}$ nitrocellulose with a water content of 25%, and the resulting mixture was kneaded manually to obtain a paste-like composition. The composition so obtained was extruded in 300 g of toluene and cut in the same manner as in Example 15 to obtain a water-containing molded product. This molded product containing toluene was subjected to vacuum-distillation at 200 Torr in the same manner as in Example 15 to obtain 152 g of a molded nitrocellulose composition with a solid content of 65%. With the molded nitrocellulose composition, the water content and the ratio of MIBK to toluene were 1.0% and 4:6, respectively. The nitrocellulose contained in the molded nitrocellulose composition had a viscosity characteristic of $L_{\frac{1}{2}}$. In the molded nitrocellulose composition, no fibrous nitrocellulose was observed, and it was a solid of high fluidity which maintained nearly the same shape as at the time of molding. Workability of removal from a container was very good.

EXAMPLE 22

100 g of methyl ethyl ketone was added to 134 g of H½ nitrocellulose having a water content of 25%, and the resulting mixture was kneaded manually to obtain a paste-like composition. The composition so obtained was extruded into 500 g of toluene and cut in the same manner as in Example 15 to obtain a water-containing molded product. This molded product containing toluene was subjected to vacuum-distillation at 200 Torr in the same manner as in Example 15 to obtain 153 g of a molded nitrocellulose composition with a solid content of 65%. The water content of the molded nitrocellulose composition was 0.7%.

EXAMPLE 23

A mixture of 60 g of ethyl acetate and 40 g of toluene was added to 134 g of H¼ nitrocellulose with a water content of 25%, and the resulting mixture was kneaded manually to obtain a paste-like composition which was somewhat hard and contained substantially no fibrous nitrocellulose. The composition so obtained was extruded in 300 g of toluene and cut in the same manner as in Example 15 to obtain a water-containing molded product. The molded product containing toluene was subjected to vacuum-distillation at 200 Torr in the same manner as in Example 15 to obtain 146 g of a molded nitrocellulose composition with a solid content of 68%. With the molded nitrocellulose composition, the water content was 0.6% and the ratio of ethyl acetate to toluene was 19:81. The molded nitrocellulose composition was a solid of no stickness which maintained nearly the same shape as at the time of molding, and workability of removal from a container was good.

EXAMPLE 24

4 kg of H½ nitrocellulose containing 25% of water was placed in a Koneader (type: KDH 60, produced by Fuji Powdal Co., Ltd.) with stirring. A previously prepared mixture of 1.2 kg of MIBK and 0.45 kg of toluene was slowly sprinked on the nitrocellulose over a period of about 2 minutes and the resulting mixture was then kneaded for 10 minutes to obtain a composition which was composed of small masses and in which the nitrocellulose was partly dissolved. This composition was charged to a pelletizer (type: EXKF, produced by Fuji Powdal Co., Ltd.) equipped with a dice having a number of 2 m/m φ holes, at the outlet thereof, molded into the form of a circular corde, introduced into a MIBK-saturated water bath and cut to a length of about 10 m/m to obtain a water-containing molded product. This molded product was taken out of the water bath and placed in a draining device with a perforated disc where the water was allowed to spontaneously drain off. This molded product and a mixed solvent of 7.125 kg of toluene and 0.375 kg of MIBK were charged to a rotary vacuum vessel with a jacket for heating and vacuum-distilled at 500 Torr for 100 minutes while heating at 90° to 95° C. to produce a molded nitrocellulose composition. With the molded nitrocellulose composition, the solid content, the water content and the ratio of MIBK to toluene were 70%, 0.6% and 26:74, respectively. The molded nitrocellulose composition maintained nearly the same shape as at the time of molding, contained substantially no fibrous or powdery nitrocellulose, and was a solid of high fluidity. Workability of removal from a container was very good. Furthermore, the electrostatic potential was 0.4 kV.

EXAMPLES 25 TO 31

REFERENCE EXAMPLES 4 TO 9 AND COMPARATIVE EXAMPLES 2 TO 4

Molded nitrocellulose compositions were produced in the same manner as in Example 24 except that the changes in production conditions as described in Table 2 were made. The results are also shown in Table 2.

TABLE 2

| | Wetted Nitrocellulose (kg) | Molding Stage Solvent Used in Kneading (kg) | State After Kneading | Liquid in Which Extrued Product is Cut[1] |
|---|---|---|---|---|
| Example | | | | |
| 25 | H½, water 25%; 4.0 | MIBK 2.0 | a small amount of fibrous nitrocellulose | MIBK-saturated water |
| 26 | H½, water 30%; 4.3 | MIBK 1.0 toluene 0.5 | several percents of fibrous nitrocellulose | MIBK-saturated water |
| 27 | H½, water 25%; 4.0 | MIBK 1.6 toluene 6.4 | about 10% of fibrous nitrocellulose | MIBK-saturated water |
| 28 | H½, ethanol 25%; 4.0 | methyl ethyl ketone 0.5; n-hexane 1.5 | a small amount of fibrous nitrocellulose | n-hexane 5.6 kg |
| 29 | H½, water 25%; 4.0 | butyl acetate 1.5 xylene 1.0 | about 20% of fibrous nitrocellulose | butyl acetate-saturated water |
| 30 | H½, ethanol 25%; 4.0 | ethyl acetate 0.6 n-hexane 1.4 | a small amount of fibrous nitrocellulose | n-hexane 4.8 kg |
| 31 | H20, water 25%; 4.0 | MIBK 1.2 toluene 4.0 | a small amount of fibrous nitrocellulose | MIBK-saturated water |
| Reference Example | | | | |
| 4[4] | H½, water 25%; 4.0 | MIBK 0.9 toluene 5.1 | partially dissolved to such an extent that no molding was possible | no molding was possible |
| 5[4] | H½, water 25%; 4.0 | butyl acetate 1.2 xylene 6.8 | partially dissolved to such an extent that no molding was | no molding was possible |

TABLE 2-continued

| | | | possible | | |
|---|---|---|---|---|---|
| 6 | H½, isopropyl alcohol 30%; 4.3 | MIBK 0.9 toluene 5.1 | paste-like | toluene 3 kg | |
| 7 | H½, water 25%; 4.0 | MIBK 1.2 toluene 0.45 | a small amount of fibrous nitrocellulose | MIBK-saturated water | |
| 8 | H½, water 25%; 4.0 | MIBK 1.2 toluene 0.45 | a small amount of fibrous nitrocellulose | " | |
| 9 | H½, water 25%; 4.0 | butyl acetate 1.0 toluene 1.0 | almost no fibrous nitrocellulose | butyl acetate-saturated water | |

Distillation Stage

| | Solvent (kg) | Degree of Vacuum (Torr) | Temperature (°C.) | Time (minutes) |
|---|---|---|---|---|
| Example | | | | |
| 25 | toluene 6.0 | 500 | 90–95 | 90 |
| 26 | toluene 4.8 MIBK 1.2 | 300 | 80–85 | 100 |
| 27 | toluene 7.2 MIBK 1.8 | 500 | 90–95 | 120 |
| 28 | n-hexane 5.6 methyl ethyl ketone 1.4 | 750 | 80 | 60 |
| 29 | xylene 4.0 | 100 | 80–85 | 70 |
| 30 | n-hexane 4.8 ethyl acetate 1.2 | 750 | 80–85 | 60 |
| 31 | toluene 5.4 MIBK 0.6 | 500 | 90–95 | 100 |
| Reference Example | | | | |
| 4[4] | — | — | — | — |
| 5[4] | — | — | — | — |
| 6 | toluene 4 MIBK 1 | 300 | 80–85 | 100 |
| 7 | toluene 25.5 MIBK 4.5 | 500 | 90–95 | 150 |
| 8 | toluene 6.75 MIBK 2.25 | 500 | 90–95 | 120 |
| 9 | toluene 4.5 butyl acetate 1.5 | 480 | 90–95 | 100 |

Properties of Molded Nitrocellulose Composition

| | Solid Content (%) | Ethanol (%) | Water Content (%) | Solvent Ratio | Shape[2] | Electrostatic[3] Potential (kV) |
|---|---|---|---|---|---|---|
| Example | | | | | | |
| 25 | 68 | — | 0.7 | MIBK 40 toluene 60 | nearly the same shape as at molding | 0.3 |
| 26 | 70 | — | 0.6 | MIBK 30 toluene 70 | nearly the same shape as at molding | 0.4 |
| 27 | 71 | — | 0.4 | MIBK 25 toluene 75 | nearly the same shape as at molding | 0.4 |
| 28 | 72 | trance | 0.3 | methy ethyl ketone 59 n-hexane 41 | nearly the same shape as at molding | 0.3 |
| 29 | 70 | — | 0.6 | butyl acetate 20 xylene 80 | nearly the same shape as at molding | 0.6 |
| 30 | 68 | trance | 0.3 | ethyl acetate 50 n-hexane 50 | nearly the same shape as at molding | 0.4 |
| 31 | 67 | — | 0.5 | MIBK 22 toluene 78 | nearly the same shape as at molding | 0.6 |
| Reference Example | | | | | | |
| 4[4] | — | — | — | — | — | — |
| 5[4] | — | — | — | — | — | — |
| 6 | 70 | trance | 0.3 | MIBK 13 toluene 87 | nearly the same shape as at molding | 0.7–0.8 |
| 7 | 65 | — | 0.6 | MIBK 16 toluene 84 | nearly the same shape as at molding | 0.7 |
| 8 | not measured | not measured | not measured | Mold lost its shape and became big mass | | not measured |
| 9 | not measured | not measured | not measured | Mold lost its shape and became big mass | | not measured |

TABLE 2-continued

| Comparative Example | | |
|---|---|---|
| 2 | H½, "Clear Chip"(5) | 0.7 |
| 3 | H½, nitrocellulose wetted with toluene to 30% (6) | 1.2–1.3 |
| 4 | H½, nitrocellulose wetted with isopropyl alcohol to 30%(7) | 0.2 |

Note:
(1)Solvent in which the strand extruded from the pelletizer is cut.
(2)The compositions of Examples 25 to 31 contained substantially no fibrous or powdery nitrocellulose and was a solid of high fluidity. Workability of removal from the container was very good.
(3)Measured by use of a current collection type potential measuring equipment KS-325 (produced by Kasuga Denki K. K.). A 0.1 m/m thick poly-ethylene sheet on the market was fixed onto a shaking plate of a horizontal shaker AS-31 (produced by Yamato Kagaku K. K.) installed in a room of 25° C. and 65% RH, and 16 g of a sample was placed on the polyethylene sheet. They were subjected to friction by shaking at 280 strokes/min (4.5 cm/stroke) for 10 minutes and charged. The potential was then measured.
(4)In Reference Examples 4 and 5, since no molding was possible, the distillation procedures were not performed.
(5)A sheet-like nitrocellulose composition consisting of 82% of H½ nitrocellulose and 18% of dibutyl phthalate, and its residual water content was 1.5%.
(6)Nitrocellulose prepared by wetted H½ nitrocellulose with 30% of toluene, and its residual water content was 0.3%.
(7)Nitrocellulose produced by Asahi Kasei Kogyo Kabushiki Kaisha and consisting of 70% of H½ nitrocellulose, 27.5% of isopropyl alcohol and 2.5% of water.

EXAMPLE 32

The molded nitrocellulose composition as obtained in Example 24 and isopropyl alcohol 30% wetted H½ nitrocellulose were allowed to stand in a room and then measured for the volatility of the volatile substance and the explosion sensitivity by a drop hammer test. The results are shown in Tables 3 and 4.

TABLE 3

| | Volatility loss when allowed to stand at 20° C. and 65% RH (original weight: 100 g) | | | |
|---|---|---|---|---|
| Period for which the sample was allowed to stand (hrs) | 8 | 24 | 48 | 72 |
| Composition of Example 24 | 5.7 g | 13 g | 21.5 g | 25 g |
| Isopropyl alcohol 30% wetted H½ nitrocellulose | 11.9 g | 21.7 g | 25.5 g | 26 g |

TABLE 4

| | Explosion Sensitivity (1/6 explosion point) | | | |
|---|---|---|---|---|
| Period for which the sample was allowed to stand (hrs) | 8 | 24 | 48 | 72 |
| Composition of Example 24 | 90 cm | 60 cm | 50 cm | 50 cm |
| Isopropyl alcohol 30% wetted H½ nitrocellulose | 50 cm | 25 cm | 24 cm | 22 cm |

Note: Explosion sensitivity

The sample for use in the measurement of the explosion sensitivity was taken out simultaneously with the one for the volatility loss and its explosion sensitivity was measured by a drop hammer test according to JIS-K-4810 for testing of performance of explosives.

As can be seen from the results in Tables 2, 3 and 4, the molded nitrocellulose composition of this invention contains substantially no alcohols and/or water, and also no plasticizers such as dibutyl phthalate, etc. It can, therefore, sufficiently exhibit the inherent function of nitrocellulose in the coated composition. Furthermore, the molded nitrocellulose composition of this invention is excellent in fluidity because it is molded. This results in a great improvement in the disadvantage of fibrous nitrocellulose, i.e., low handling workability resulting from the low fluidity due to intertwinement of fibrous materials. Another advantage of the molded nitrocellulose composition of this invention is that the danger of charging, which is one of the disadvantages of toluene wetted nitrocellulose, can be well improved. For example, its degree of charging is equal to or less than that of "Clear Chip" now available on the market. Furthermore, the volatilization of the volatile substance is slower in the composition of this invention than in the isopropyl alcohol wetted nitrocellulose, and the composition of this invention is excellent in impact resistance as can be seen from the results of the explosion sensitivity test. Thus, the composition of this invention is a novel molded nitrocellulose composition of high usefulness.

EXAMPLE 33

| | |
|---|---|
| γ-Fe$_2$O$_3$ (major axis 0.8μ, minor axis 0.1μ) | 400 parts |
| Lecithin | 5 |
| Carbon Black | 12 |
| Methyl Ethyl Ketone | 300 |
| Methyl Isobutyl Ketone | 300 |
| Toluene | 300 |
| Tetrahydrofuran | 100 |
| Organic Liquid-containing Nitrocellulose* | 25 |
| Polyurethane Resin (solid content 35%) (produced by Japan Polyurethane Co., Ltd. under the trade name of "Nipporan") | 60 |
| Isocyanate Group-containing Resin (solid content 75%) (produced by Japan Polyurethane Co., Ltd. under the trade name of "Colonate U") | 15 |

*Note:
Produced in the same manner as in Example 26.
Nitrocellulose/methyl isobutyl ketone/tolune = 70/9/21
Alcohol content = 0%
Water content = 0.2%

The above ingredients were mixed in a sand mill for 3 hours to obtain a magnetic paint composition. This magnetic paint composition was coated on a polyester film in a thickness of 6μ and then dried at 80° C. for 48 hours. The polyester film was cut to 178 inch width to obtain a magnetic recording tape for video. The magnetic recording tape so obtained was measured in adhesion strength and friction coefficient. The results are shown in Column A of Table 5.

The adhesion strength is a stripping strength when removing the magnetic surface from the base film in a direction of 180°, and the friction coefficient was measured by causing the friction between brass and the magnetic surface at a low speed.

EXAMPLE 34

Magnetic tapes were produced in the same manner as in Example 33 except that the amount of the organic liquid-containing nitrocellulose being added was changed to 56 parts, 40 parts, 6.3 parts and 4 parts. These magnetic tapes were measured in the adhesion strength and friction coefficient. The results are shown in Columns B, C, D and E of Table 5.

EXAMPLE 35

A magnetic tape was produced in the same manner as in Example 33 except that the following nitrocellulose was used in place of the organic liquid-containing nitrocellulose and it was added in an amount of 60 parts.

Nitrocellulose/n-butyl acetate=71/29
Alcohol content=0%
Water content=0.4%

This magnetic tape was measured in the adhesion strength and friction coefficient. The results are shown in Column F of Table 5.

COMPARATIVE EXAMPLE 5

A magnetic tape was produced in the same manner as in Example 33 except that 25 parts of Nitrocellulose HIG ½ (alcohol content 27.5%, water content 2.5%, produced by Asahi Kasei Kogyo Kabushiki Kaisha) was used in place of the organic liquid-containing nitrocellulose.

This magnetic tape was measured in the adhesion strength and friction coefficient. The results are shown in Column G of Table 5.

COMPARATIVE EXAMPLE 6

A magnetic tape was produced in the same manner as in Example 33 except that 20 parts of Clear Chip H½ (alcohol content=0%, water content=1.0%, dibutyl phthalate content=12%, produced by Asahi Kasei Kogyo Kabushiki Kaisha) was used in place of the organic liquid-containing nitrocellulose.

This magnetic tape was measured in the adhesion strength and friction coefficient. The results are shown in Column H of Table 5.

TABLE 5

| Nitrocellulose | Amount of nitrocellulose in binder (%)* | Adhesion strength (g/½ inch) | Friction coefficient |
|---|---|---|---|
| A Organic liquid-containing nitrocellulose | 35.2 | 140 | 0.27 |
| B Organic liquid-containing nitrocellulose | 54.8 | 20 | 0.24 |
| C Organic liquid-containing nitrocellulose | 46.5 | 100 | 0.25 |
| D Organic liquid-containing nitrocellulose | 12.0 | 165 | 0.29 |
| E Organic liquid-containing nitrocellulose | 8.0 | 180 | 0.36 |
| F Organic liquid-containing nitrocellulose | 35.2 | 150 | 0.28 |
| G alcohol wetted-nitrocellulose | 35.2 | 130 | 0.38 |
| H DBP wetted-nitrocellulose | 35.3 | 110 | 0.42 |

*Calculated based on pure nitrocellulose.

As can be seen from the above results, addition of nitrocellulose to the binder of the magnetic paint in an amount of 10 to 50%, said nitrocellulose containing an organic solvent which is capable of dissolving nitrocellulose and is inert to the isocyanate group, or a mixture of said organic solvent and organic non-solvent which is not capable of dissolving nitrocellulose and is inert to the isocyanate group, and containing substantially no water and/or alcohols, provides a good magnetic recording medium which is well balanced between the adhesion strength to the support and the friction coefficient of the magnetic surface.

While the invention has been described in detail and with reference to specific embodiment thereof, it will be apparent to one skilled in the art that various changes and modifications can be made therein without departing from the spirit and scope thereof.

What is claimed is:

1. A non-sticking molded solid nitrocellulose composition containing substantially no water, which consists of a homogeneous phase comprising about 60% to 80% by weight nitrocellulose as a sole solid forming component, an organic liquid inert to isocyanate which is an organic solvent capable of dissolving nitrocellulose, and an organic non-solvent incapable of dissolving nitrocellulose and being selected from the group consisting of hexane, heptane, octane, solvent naphtha, cyclohexane, methyl cyclohexane, benzene, toluene, and xylene, the weight ratio of said organic solvent to said organic non-solvent in the mixture being at least 1/9, said non-sticking molded solid nitrocellulose composition being produced by mixing a nitrocellulose starting material wetted with alcohol, water or both, with the solvent or the mixture of the solvent and non-solvent, wherein the solvent is used in the smallest amount possible to obtain a semi-solid composition, molding the semi-solid composition and then removing the alcohol, water or both from the molded composition by distillation.

2. A non-sticking molded solid nitrocellulose composition as claimed in claim 1, wherein the organic solvent capable of dissolving nitrocellulose is selected from the group consisting of ethyl acetate, propyl acetate, butyl acetate, ethylene glycol monomethyl ether acetate, methyl ethyl ketone, methyl isobutyl ketone, isophorone, cyclohexanone, nitroethane, and nitropropane, or a mixture of said organic solvents.

3. A non-sticking molded solid composition as claimed in claim 1, wherein the non-sticking molded solid nitrocellulose does not contain more than 1 percent by weight of water.

4. A non-sticking molded solid composition as claimed in claim 1, wherein the non-sticking molded solid nitrocellulose composition is in the form of pellets or flakes.

5. A process for producing a non-sticking molded solid nitrocellulose composition containing substantially no water and consisting of a homogeneous phase, which comprises mixing a nitrocellulose starting material wetted with alcohol, water or both, with a solvent capable of dissolving nitrocellulose and a non-solvent incapable of dissolving nitrocellulose selected from the group consisting of hexane, heptane, octane, solvent naphtha, cyclohexane, methyl cyclohexane, benzene, toluene, and xylene to obtain a semi-solid homogeneous composition, molding the semi-solid homogeneous composition, and removing the alcohol, water or both from the molded composition by distillation.

6. A process as in claim 5, wherein the semi-solid homogeneous composition is molded in the form of pellets or flakes.

7. A process as in claim 5, wherein the dissolving is performed with said solvent in the smallest possible amount to obtain a semi-solid homogeneous composition.

8. A process as in claim 5, wherein the non-solvent incapable of dissolving nitrocellulose or a mixture of the solvent capable of dissolving nitrocellulose and the non-solvent incapable of dissolving nitrocellulose is added to the molded semi-solid homogeneous composition prior to the removing by distillation.

9. A process as in claim 5, wherein the non-solvent incapable of dissolving nitrocellulose or a mixture of the solvent capable of dissolving nitrocellulose and the non-solvent incapable of dissolving nitrocellulose is added to the molded semi-solid homogeneous composition during the removing by distillation.

10. A process as in claim 5, wherein the solvent is present in an amount of about 30% or more based on the nitrocellulose at the state of dissolution.

* * * * *